United States Patent [19]

Bales et al.

[11] Patent Number: 5,532,331

[45] Date of Patent: Jul. 2, 1996

[54] THIODIPHENOL COPOLYCARBONATES AND THEIR USE AS COMPONENTS OF MULTILAYERED POLYMERIC REFLECTIVE BODIES

[75] Inventors: Stephen E. Bales; Charles A. Langhoff; John A. Wheatley, all of Midland, Mich.

[73] Assignee: The Dow Chemical Company, Midland, Mich.

[21] Appl. No.: 351,436

[22] PCT Filed: Jun. 24, 1993

[86] PCT No.: PCT/US93/06074

§ 371 Date: Dec. 15, 1994

§ 102(e) Date: Dec. 15, 1994

[87] PCT Pub. No.: WO94/02533

PCT Pub. Date: Feb. 3, 1994

[51] Int. Cl.$^6$ ..................................................... C08G 64/00
[52] U.S. Cl. .......................... 528/196; 359/586; 359/500; 359/589; 428/412; 528/171; 528/174; 528/193; 528/194; 528/190; 528/201; 528/202; 528/204; 528/219
[58] Field of Search ..................................... 528/193, 196, 528/190, 201, 202, 204, 219, 171, 174; 359/586, 500, 589; 428/412

[56] References Cited

U.S. PATENT DOCUMENTS

| | | | |
|---|---|---|---|
| 4,210,741 | 7/1980 | Bagget | 528/196 |
| 4,426,514 | 1/1984 | Krishnan et al. | 528/204 |
| 4,448,950 | 5/1984 | Baron et al. | 528/128 |
| 5,122,905 | 6/1992 | Wheatley et al. | 359/586 |
| 5,122,906 | 6/1992 | Wheatley | 359/586 |

FOREIGN PATENT DOCUMENTS

| | | |
|---|---|---|
| 2377267 | 8/1978 | France . |
| 1187797 | 2/1965 | Germany . |

*Primary Examiner*—James J. Seidleck
*Assistant Examiner*—Terressa Mosley

[57] ABSTRACT

This invention provides novel copolycarbonates that exhibit improvements in glass transition temperature, refractive index, and limiting oxygen index compared to prior art thiodiphenol/bisphenol A copolycarbonates. The copolycarbonates of this invention comprise the reaction products of 4,4'-thiodiphenol and compounds such as 9,9-bis (4-hydroxyphenyl) fluorene with phosgene. They are useful as components of multilayered polymeric reflective bodies.

5 Claims, No Drawings

THIODIPHENOL COPOLYCARBONATES AND THEIR USE AS COMPONENTS OF MULTILAYERED POLYMERIC REFLECTIVE BODIES

BACKGROUND OF THE INVENTION

This application is a continuation of PCT/US93/06074.

This invention relates generally to copolycarbonates; their method of preparation; their use in preparing improved polymeric bodies; and the improved polymeric bodies. More specifically, the invention concerns novel 4,4'-thiodiphenol (TDP) copolycarbonates having properties that make them particularly suitable for preparing certain types of multilayered polymeric bodies.

U.S. Pat. Nos. 5,122,905 and 5,122,906 teach the use of polycarbonates in preparing highly reflective multilayered polymeric bodies. The only polycarbonate it specifically discloses in its Examples is a homopolycarbonate of bisphenol A (Calibre 300-22, trademark of The Dow Chemical Company). We concluded that it would be desirable to provide materials with improvements in glass transition temperature (Tg), refractive index (RI), and limiting oxygen index (LOI). Such materials would significantly expand the application areas for the multilayered polymeric bodies.

In addition, several recent published patent applications teach the use of (previously known) copolycarbonates of 4,4'-thiodiphenol (TDP) and bisphenol A (BA) as the high refractive index (RI) component of a multilayered polymeric reflective body.

SUMMARY OF THE INVENTION

This invention provides novel copolycarbonates that typically exhibit the desired improvements in Tg, RI, and LOI compared to the prior art TDP/BA copolycarbonates (and BA homopolycarbonates). More particularly, this invention provides novel copolycarbonates of TDP and at least one member of the group consisting of 9,9-bis (4-hydroxyphenyl) fluorene (BHPF); 1,1-bis ( 4-hydroxyphenyl)-1-phenyl ethane (bisphenol AP, BAP); phenolphthalein (PP); bis (4-hydroxyphenyl) diphenyl methane (BHDM); tetrabromobisphenol A (TBBA); and tetrachlorobisphenol A (TCBA).

A first broad aspect of the invention is a copolycarbonate of 4,4'-thiodiphenol and at least one member of the group consisting of 9,9-bis (4-hydroxy-phenyl) fluorene; 1,1-bis (4-hydroxyphenyl)-1-phenyl ethane; phenolphthalein; bis (4-hydroxyphenyl) diphenyl methane; tetrabromobisphenol A; and tetrachlorobisphenol A.

A second broad aspect of the invention is a multilayered polymeric reflective body wherein the highest refractive index component is a copolycarbonate of 4,4'-thiodiphenol and at least one member of the group consisting of 9,9-bis (4-hydroxyphenyl) fluorene; 1,1-bis (4-hydroxyphenyl)-1-phenyl ethane; phenolphthalein; bis (4-hydroxyphenyl) diphenyl methane; tetrabromobisphenol A; and tetrachlorobisphenol A.

A third broad aspect of the invention is a process for making copolycarbonates comprising reacting 4,4'-thiodiphenol and at least one member of the group consisting of 9,9-bis (4-hydroxyphenyl) fluorene; 1,1-bis (4-hydroxyphenyl)-1-phenyl ethane; phenolphthalein; bis (4-hydroxyphenyl) diphenyl methane; tetrabromobisphenol A; and tetrachlorobisphenol A with a carbonate precursor under conditions sufficient to cause reaction.

DETAILED DESCRIPTION OF THE INVENTION

In the practice of this invention the copolycarbonate advantageously comprises from 10 to 80 mole percent TDP.

In the most preferred embodiment of the invention TDP is copolymerized with BHPF. Methods of producing polycarbonates are well known in the prior art. Such methods are also suitable for use in forming the copolycarbonate compositions of the present invention. Suitable methods for preparing polycarbonates are set forth in U.S. Pat. Nos. 3,248,414; 3,153,008; 3,215,668; 3,187,065; 3,028,365; 2,999,846; 2,999,835; 2,964,974; 2,970,137; and 1,991,273. The copolycarbonates of the present invention are prepared by the reaction of the bisphenol mixture with a carbonate polymer precursor, which may include either a carbonyl halide, a diaryl carbonate, a dialkyl carbonate, or a bishaloformate.

This invention is further illustrated by the following examples.

EXAMPLE 1 (INCLUDING TYPICAL PREPARATION)

This example describes the synthesis of a 50/50 molar ratio copolycarbonate of TDP and BHPF. A 5 L 4-neck roundbottom flask equipped with a thermometer, condenser, phosgene/nitrogen inlet, and a paddle stirrer connected to a Cole Parmer servodyne was charged with TDP (105.52 g, 0.484 mol), BHPF (169.40 g, 0.484 mol), 4-tertbutylphenol (2.18 g, 14.5 mmol, 1.5 mol % based on bisphenols), pyridine (199.0 g, 2.516 mol), and methylene chloride (2.36 L). The mixture was stirred at 250 rpm and slowly purged with nitrogen as phosgene (95.8 g, 0.968 mol) was bubbled in over 50 minutes while maintaining the reactor temperature at 20° to 24° C. An additional 4.0 g of phosgene was then added over a period of 7 minutes.

The reaction mixture was worked up by adding methanol (5 mL) and then 3N HCl (3.6 L). After stirring for 15 minutes, the mixture was allowed to stand overnight. The methylene chloride layer was separated and washed further with 0.5N HCl (0.42 L), water (0.4 L), and was then passed through a column of MSC-1-H ion exchange resin (0.5 L bed volume). The copolymer was isolated by adding 0.9 L of this purified methylene chloride solution to a mixture of 1.2 L hexane and 2.4 L acetone in an explosion resistant Waring blender. The product was filtered, dried in a hood overnight, and then dried for 48 hours in a vacuum oven at approximately 120° C. The resulting copolycarbonate weighed 267.7 g, had an inherent viscosity (IV) of 0.52 dL/g (determined in methylene chloride at 0.5 g/dL and 25° C.), and exhibited an extrapolated onset Tg of 215° C. (determined by DSC at a scan rate of 20° C./minute). $^1$H NMR analysis was in agreement with the 50/50 TDP/BHPF monomer feed ratio. A compression molded plaque, prepared at 320° C., had a RI of 1.650 when measured at 600 nm.

EXAMPLES 2–7

Additional copolycarbonates of the type TDP/X were prepared over a range of molar ratios and essentially according to the general procedure of Example 1 except the bisphenol X was selected from BHPF (Example 2), BAP (Example 3), PP (Example 4), TBBA (Example 5), TCBA (Example 6), and BHDM (Example 7). These compositions and the results for IV, Tg, RI, and LOI are summarized in Table 1. LOI measurements were performed on compression molded specimens (0.125 inch thickness, molded at approximately 100° C. above Tg) according to ASTM Test Method D-2863. For comparison, results are also shown for prior art TDP/BA copolycarbonates. As evidenced by the results of Table 1, the new TDP copolycarbonates of this invention (Examples 2–7) provide significant improvements in Tg, RI, and LOI compared to corresponding TDP/BA copolycarbonates (Comparative Example).

TABLE 1

| Ex. No. | Diol X | Mole % X | IV (dL/g) | Tg (°C.) | RI (at 600 nm) | LOI (% O$_2$) |
|---|---|---|---|---|---|---|
| Comp. | BA* | 25 | 0.51 | 125 | 1.636 | 46.9 |
|  |  | 50 | 0.54 | 135 | 1.614 | 37.2 |
|  |  | 75 | 0.56 | 140 | 1.601 | 29.0 |
| 2 | BHPF | 25 | 0.49 | 165 | 1.651 | 58.0 |
|  |  | 50 | 0.37 | 207 | 1.652 | NM |
|  |  | 50 | 0.60 | 216 | 1.649 | 59.7 |
|  |  | 75 | 0.57 | 253 | NM** | NM |
| 3 | BAP | 25 | 0.51 | 139 | 1.642 | 49.5 |
|  |  | 35 | 0.48 | 146 | 1.635 | NM |
|  |  | 50 | 0.46 | 154 | 1.627 | 42.5 |
|  |  | 75 | 0.50 | 175 | 1.618 | 39.5 |
| 4 | BHDM | 25 | 0.47 | 148 | 1.647 | NM |
| 5 | TBBA | 15 | 0.48 | 143 | NM | NM |
|  |  | 20 | 0.41 | 149 | NM | NM |
|  |  | 25 | 0.39 | 154 | 1.642 | NM |
|  |  | 50 | 0.40 | 196 | 1.634 | NM |
|  |  | 75 | 0.54 | 234 | NM | NM |
| 6 | TCBA | 25 | 0.42 | 147 | NM | NM |
|  |  | 50 | 0.43 | 179 | NM | NM |
|  |  | 75 | 0.34 | 200 | NM | NM |
| 7 | PP | 25 | 0.46 | 152 | NM | NM |
|  |  | 50 | 0.52 | 197 | NM | NM |
|  |  | 75 | 0.44 | 223 | NM | NM |

*Not an example of this invention.
**NM = not measured.

As can be seen these polymers possess very desirable combinations of physical and optical properties, particularly the high refractive index and good heat resistance and processing temperatures. These and other properties make the polymers according to the present invention well suited to be employed as layers of varying thickness in multilayered structures, optionally also comprising other features, to achieve selected transmission, reflective and other optical effects.

Examples of these applications for the compositions according to this invention include use as a high refractive index layer in the reflective polymeric bodies as shown in U.S. Pat. Nos. 5,122,905; 5,122,906; 5,217,794 and 5,126,880. Among the benefits obtained using these materials in these and other types of structures are the ability to provide greater differences in refractive index versus another given polymer and the corresponding benefits of obtaining increased reflectance for a given number of layers or obtaining equivalent reflectance with less layers.

It is also possible to employ the polymers according to this invention as a high refractive index layer of an appropriate thickness to suppress higher order reflectance as is shown in the visibly transparent infrared (IR) reflective films in U.S. Pat. No. 5,103,337. These materials are similarly suitable for use as high refractive index layers in other spectrally selective reflectors. These polymers can also suitably be employed as a high refractive index layer in the tamper evident films as shown in U.S. Pat. No. 5,149,578; in the covert signature films as shown in U.S. Pat. No. 5,095,210; and in the birefringent interference polarizer films as shown in EP 488,544.

Various modifications may be made in the present invention without departing from the spirit or scope thereof as will be evident to those skilled in the art.

What is claimed is:

1. A copolycarbonate of 4,4'-thiodiphenol and 9,9-bis (4-hydroxyphenyl) fluorene.

2. A copolycarbonate of claim 1 comprising 4,4'-thiodiphenol in an amount of from 10 to 80 mole percent of the copolycarbonate.

3. The copolycarbonate of claim 1 comprising the reaction product of (a) a carbonate polymer precursor selected from the group consisting of a carbonyl halide, a diaryl carbonate, a dialkyl carbonate and a bishaloformate; (b) 4,4'-thiodiphenol; and (c) 9,9-bis (4-hydroxyphenyl) fluorene.

4. A multilayered polymeric reflective body wherein the highest refractive index component is a copolycarbonate of 4,4'-thiodiphenol and 9,9-bis (4-hydroxyphenyl) fluorene.

5. A multilayered polymeric reflective body wherein the highest refractive index component is a copolycarbonate comprising the reaction product of (a) a carbonate polymer precursor selected from the group consisting of a carbonyl halide, a diaryl carbonate, a dialkyl carbonate and a bishaloformate; (b) 4,4'-thiodiphenol; and (c) 9,9-bis (4-hydroxyphenyl) fluorene.

* * * * *